Feb. 7, 1961  R. L. DEAN  2,970,387
QUESTION AND ANSWER DEVICE
Filed Jan. 29, 1959

INVENTOR
RALPH L. DEAN
BY HIS ATTORNEYS
HARRIS, KIECH, RUSSELL & KERN

United States Patent Office 2,970,387
Patented Feb. 7, 1961

2,970,387

QUESTION AND ANSWER DEVICE

Ralph L. Dean, 234 Terrace St., Altadena, Calif.

Filed Jan. 29, 1959, Ser. No. 789,883

7 Claims. (Cl. 35—9)

This invention relates to a question and answer device which may be used by a student for self-teaching and self-drilling. Basically, the device presents a question or problem to the student who manually selects what he believes to be the correct answer. If the student chooses the correct answer, the device then presents a different, randomly selected problem. However, if an incorrect solution is selected, the device cannot be actuated and the student must try again. The device may be used in any of a variety of subjects, including arithmetic, history, music, reading, spelling, or the like. The device may be used with problems which provide a direct answer on the face of the device, with multiple choice questions, with questions calling for a correlation between indicia on the device and associated charts, and similar applications.

It is an object of the invention to provide an educational device which presents a problem and a plurality of possible answers to the student and which presents another, randomly selected problem if the previous problem is answered correctly. A further object is to provide such a device wherein a new group of problems and answers, in the same or a different field, may be substituted directly for the first group of problems and answers. A further object is to provide such a device wherein the answer to each problem is available on the face of the device, visible through a normally covered window.

It is an object of the invention to provide an educational device having a plurality of manually engageable actuators only some of which are accessible at any one time, with an indicium correlated with each accessible actuator and with one of the accessible actuators being a real actuator for changing the problem presented and with the remaining accessible actuators being simulated actuators which, if chosen, will not change the problem condition of the device, thereby indicating that an incorrect answer has been selected.

It is an object of the invention to provide an educational device having a problem wheel operated in conjunction with a one-way clutch structure and a return spring system so that the problem wheel may be manually rotated in a first direction carrying the clutch structure therewith against the urging of the spring system and so that the spring system will return the clutch structure and wheel to the initial position with the momentum of the returning wheel producing over-running of the wheel relative to the clutch structure to establish a new problem condition. A further object is to provide such a device wherein the clutch structure includes a wheel control member having a ratchet thereon for engaging the wheel so that the wheel and the control member rotate in synchronism in a first direction driven manually through the wheel and rotate in synchronism in the opposite direction driven by the spring system with the wheel being movable relative to the control member in the opposite direction.

The invention also comprises novel details of construction and novel combinations and arrangements of parts, which will more fully appear in the course of the following description. The drawing merely shows and the description merely describes a preferred embodiment of the present invention for use in conjunction with arithmetic problems which are given by way of illustration or example. It is understood, of course, that the same structure is equally useable with other types of problems.

Figure 1:
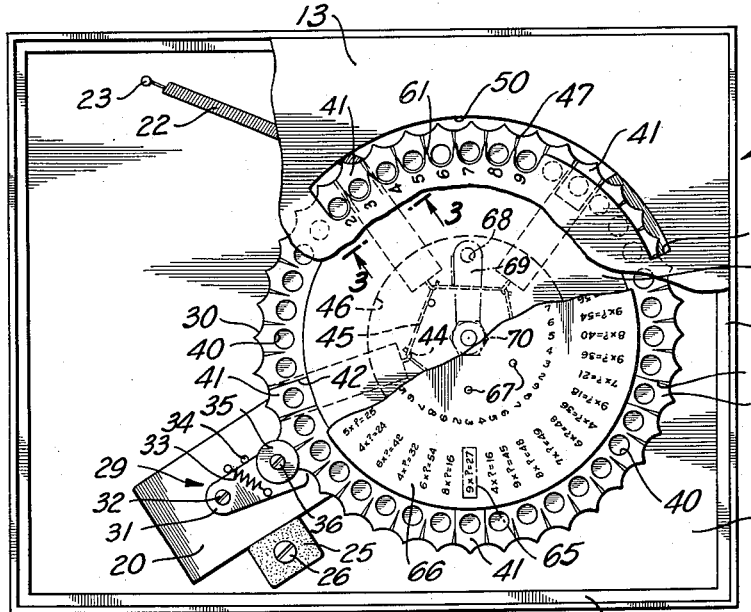
Fig. 1 is a top view of a preferred embodiment of the invention with a portion of the cover plate and problem disc broken away.
Figure 3:
Fig. 3 is an enlarged sectional view taken along the line 3—3 of Fig. 1.

The embodiment of the invention shown in the drawing is enclosed in a housing 10 having a base 11, upstanding sides 12 and a cover plate 13. A problem wheel 14 is carried within the housing 10 on a shaft 15 mounted on the base 11 with a bearing unit 16 providing for rotation of the wheel relative to the base.

In the preferred form of the invention illustrated herein, a wheel control member 20 is mounted on a bearing unit 21 for rotation concentric with the problem wheel. A tension spring 22 connected between a pin 23 in the base 11 and a bracket 24 in the member 20 urges the member counterclockwise as viewed in the drawing against a stop 25. The stop 25 is preferably a block of rubber or similar material for absorbing the impact of the member 20, the stop being fixed to the base by a screw 26.

A ratchet unit 29 is carried on the member 20 for engaging the convoluted edge 30 of the problem wheel 14. An arm 31 is pivotally mounted on the member 20 by a screw 32. A tension spring 33 fixed between the member 20 and arm 31 urges the arm counterclockwise against a stop pin 34. A wheel 35 is carried on the arm 31 on a screw 36, the wheel being freely rotatable relative to the arm.

Figure 2:
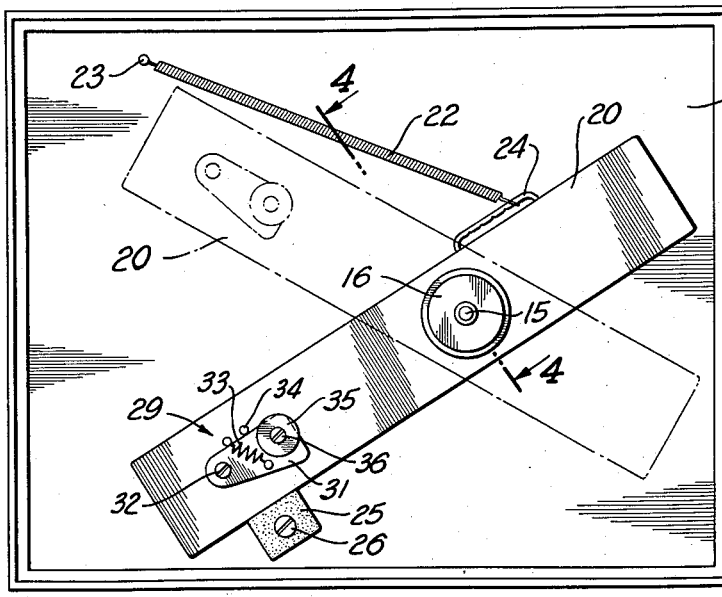
Fig. 2 is a view similar to that of Fig. 1 with the cover plate and wheel removed.
Figure 4:
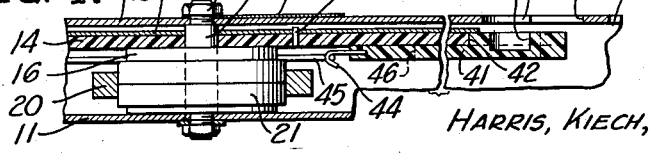
Fig. 4 is an enlarged sectional view taken along the line 4—4 of Fig. 2.

When the device is in the rest position, as shown in Fig. 1, the wheel 35 engages one concave section of the edge of the problem wheel 14 so that when the problem wheel is rotated clockwise, the wheel control member will be carried along therewith. The problem wheel is designed for manual rotation clockwise through an arc of about 90°, bringing the control member to a position such as that shown in phantom in Fig. 2. Then the problem wheel is released and the spring 22 will return the control member and the problem wheel to the rest position with the control member engaging the stop 25. However, the momentum of the problem wheel generated by its counterclockwise rotation will cause it to continue to rotate counterclockwise after the control member has engaged the stop. The ratchet unit 29 permits this independent movement of the problem wheel and also serves as a brake to stop the wheel at a new angular position relative to the control member. The control member with its ratchet unit functions as a one-way clutch wherein the problem wheel can rotate counterclockwise relative to the control member but cannot rotate clockwise except by carrying the control member against the urging of the spring 22. It is, of course, clear that the particular type of ratchet shown in the drawing is not necessary for the proper operation of the unit and that the control member and problem wheel do not have to be mounted for concentric rotation.

A plurality of wheel actuators are provided around the periphery of the problem wheel, each actuator being manually engageable for the purpose of rotating the wheel. In the embodiment of Fig. 1, a plurality of openings 40 are provided around the periphery of the wheel 14, each opening being of a size for receiving a finger or a pencil for imparting rotational movement to the wheel. A few of the openings 40, five in the embodiment of Fig. 1, are located in bars 41 which are slidably mounted in the wheel 14, the outer edge of said bars being shaped to form a part of the convoluted edge 30 of the wheel 14 when in their normal position. A portion 42 of the rim of the wheel 14 is notched to receive the bar 41 and a wedge-shaped slideway 43 is provided to receive and support the bar. A hook 44 is provided on the inner end of each of the bars 41 for engaging a tension member such as a rubber band 45 which urges all five bars to the inner position as shown in Fig. 1, the rubber band being positioned in a counterbore 46 in the underside of the wheel 14. Each of the bars 41 has parallel sides. The openings 40 not associated with sliding bars 41 are provided with parallel lines with wedge-shaped segments 47 therebetween so as to simulate the sliding bars in order to make visual detection of the sliding bars difficult.

The cover plate 13 has an arcuate opening 50 which provides access to a number of the actuator openings 40. Fingers 61 of the cover plate project into the opening 50 between adjacent actuator openings 40 and indicia such as the numerals 2 through 9 are provided on the cover plate adjacent the actuator openings. The fingers 61 serve as stops so that if the student places his finger or a pencil into an actuator opening such as the opening opposite the numeral 6, he will not be able to rotate the problem wheel. However, if the student engages the opening opposite the numeral 3, he will be able to move the bar 41 radially outward permitting his finger to clear the stop finger and the wheel can be rotated clockwise toward the end 62 of the access opening 50. When the student releases the sliding bar 41, it will return to its inner position and the wheel and control member will rotate counterclockwise as previously described and the wheel will overrun the control member and stop at a randomly determined position.

A problem window 65 is provided in the cover plate 13 so that a problem carried on the problem wheel can be viewed by the student. The problems may be printed directly on the wheel but preferably are carried on a plate 66 which in turn is supported on the wheel, engaging indexing pins 67. Various types of problems can be handled by the device, the embodiment herein exemplifying multiplication. In the example of Fig. 1, the problem presented at the window 65 is 9×?=27. The proper answer is 3 and the sliding bar 41 is positioned opposite the numeral 3 on the cover plate so that when the student selects the proper answer, the device is actuated to present a new problem at the window 65. However, if the student selects an incorrect answer, he is not able to move the wheel and gets an immediate indication that his first solution was not correct.

The correct answer may also be indicated on the device if desired. An answer window 68 in the cover plate is ordinarily covered by an arm 69 carried on the shaft 15 by a nut 70 which serves to hold the arm 68 and the cover plate 13 in position on the housing. The proper answers to each problem on the problem plate are also carried on the plate as shown in Fig. 1 and are correlated so that when a particular problem appears at the window 65 the proper answer appears at the window 68.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In an educational device, the combination of: a base; a wheel rotatably mounted on said base, said wheel including a plurality of manually engageable actuators for rotation of said wheel in a first direction; a wheel control member carried on said base and engageable with said wheel, said control member including resilient means urging said control member to a first position with said wheel being rotatable past said first position, said control member being movable in said first direction away from said first position by said wheel with said resilient means returning said control member and wheel to said first position, whereby the momentum of said wheel carries it past said first position; and a cover plate overlying said wheel, said plate having an opening providing access to some of said wheel actuators, said plate having stop means for preventing rotation of said wheel when an actuator is engaged through said opening, with one of said accessible actuators being manually movable relative to said wheel and plate to bypass said stop means and move said wheel and control member in said first direction.

2. In an educational device, the combination of: a base; a wheel rotatably mounted on said base, said wheel including a plurality of manually engageable actuators for rotation of said wheel in a first direction; a wheel control member carried on said base and engageable with said wheel, said control member including resilient means urging said control member to a first position with said wheel being rotatable past said first position, said control member being movable in said first direction away from said first position by said wheel with said resilient means returning said control member and wheel to said first position, whereby the momentum of said wheel carries it past said first position; and a cover plate overlying said wheel, said plate having an opening with radially extending fingers providing access to individual wheel actuators between said fingers whereby a finger prevents rotation of said wheel by manual engagement of an actuator through said opening, with one of said accessible actuators being radially slidable in said wheel when manually engaged through said opening to clear the associated finger for rotation of said wheel in said first direction.

3. In an educational device, the combination of: a base; a wheel rotatably mounted on said base, said wheel including a plurality of manually engageable actuators, at least one of said actuators being a real actuator for rotation of said wheel in a first direction, others of said actuators being simulated actuators which cannot be used to rotate said wheel; and a wheel control member carried on said base and engageable with said wheel, said control member including resilient means urging said control member to a first position with said wheel being rotatable past said first position, said control member being movable in said first direction away from said first position by said wheel with said resilient means returning said control member and wheel to said first position whereby the momentum of said wheel carries it past said first position.

4. In an educational device, the combination of: a base; a wheel rotatably mounted on said base, said wheel including a plurality of manually engageable actuators for rotation of said wheel in a first direction; a plurality of problems carried on said wheel; a wheel control member carried on said base and engageable with said wheel, said control member including resilient means urging said control member to a first position with said wheel being rotatable past said first position, said control member being movable in said first direction away from said first position by said wheel with said resilient means returning said control member and wheel to said first position whereby the momentum of said wheel carries it past said first position; and a cover plate overlying said wheel, said plate having a window for viewing one of said problems and having an opening providing access to some of said wheel actuators, said opening having indicia therealong corresponding to possible solutions to said problems with individual indicium correlated with individual accessible actuators, said plate having stop means for preventing rotation of said wheel when an actuator is engaged through said opening with one of said accessible actuators being manually movable relative to said wheel and plate to bypass said stop means and move said wheel and control member in said first direction so that on release of said actuator a different, randomly selected problem is presented at said window, with the indicium correlated with said one actuator corresponding to the solution to the problem viewed through said window.

5. In an educational device, the combination of: a base; a wheel rotatably mounted on said base, said wheel including a plurality of manually engageable actuators for rotation of said wheel in a first direction; a plurality of problems carried on said wheel; one-way clutch means carried on said base and coupled to said wheel; resilient means for urging said clutch means in a direction opposite to said first direction, said resilient means moving said clutch means and wheel in said opposite direction when said wheel is released, with said clutch means permitting overrunning of said wheel in said opposite direction; and a cover plate overlying said wheel, said plate having a window for viewing one of said problems and having an opening providing access to some of said wheel actuators, said opening having indicia therealong corresponding to possible solutions to said problems with individual indicium correlated with individual accessible actuators, said plate having stop means for preventing rotation of said wheel when an actuator is engaged through said opening wtih one actuator being manually movable relative to said wheel and plate to bypass said stop means and move said wheel and clutch means in said first direction so that on release of said actuator a different, randomly selected problem is presented at said window, with the indicium correlated with said one actuator corresponding to the solution to the problem viewed through said window.

6. In an educational device, the combination of: a base having an index; a wheel rotatably mounted on said base, said wheel including a plurality of manually engageable actuators for rotation of said wheel in a first direction through a predetermined arc to said index; one-way clutch means carried on said base and coupled to said wheel; and spring means for urging said clutch means in a direction opposite to said first direction, said spring means moving said clutch means and wheel in said opposite direction when said wheel is released, with said clutch means permitting overrunning of said wheel in said opposite direction.

7. In an educational device, the combination of: a base; first and second concentrically rotatable members mounted on said base; a rachet carried on said second member for engaging said first member whereby said first member drives said second member in a first direction and said second member drives said first member in the opposite direction; spring means for urging said second member in said opposite direction; a stop for limiting movement of said second member in said opposite direction; and a plurality of manually engageable actuators carried on said first member for rotating said first member in said first direction with said first member carrying said second member therewith against the urging of said spring means so that on release of said first member said spring means rotates said members through an equal angle in the opposite direction bringing said second member to rest against said stop with said first member continuing to move through an unknown angle.

References Cited in the file of this patent

UNITED STATES PATENTS

| | | |
|---|---|---|
| 455,100 | Harris | June 30, 1891 |
| 602,700 | Fuchs | Apr. 19, 1898 |
| 1,749,226 | Pressey | Mar. 4, 1930 |
| 2,157,058 | Ray | May 2, 1939 |
| 2,690,621 | Dean | Oct. 5, 1954 |
| 2,704,210 | Wolfe | Mar. 15, 1955 |
| 2,887,006 | Yale | May 19, 1959 |